March 11, 1952 E. M. STAPLES 2,589,158
MOBILE-RADIO AND WIRE SYSTEM
Filed April 2, 1948 4 Sheets-Sheet 1
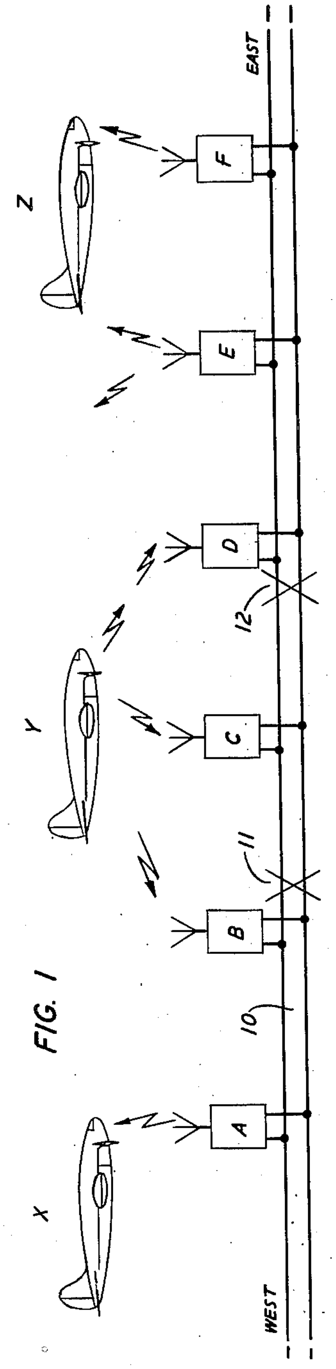
FIG. 1
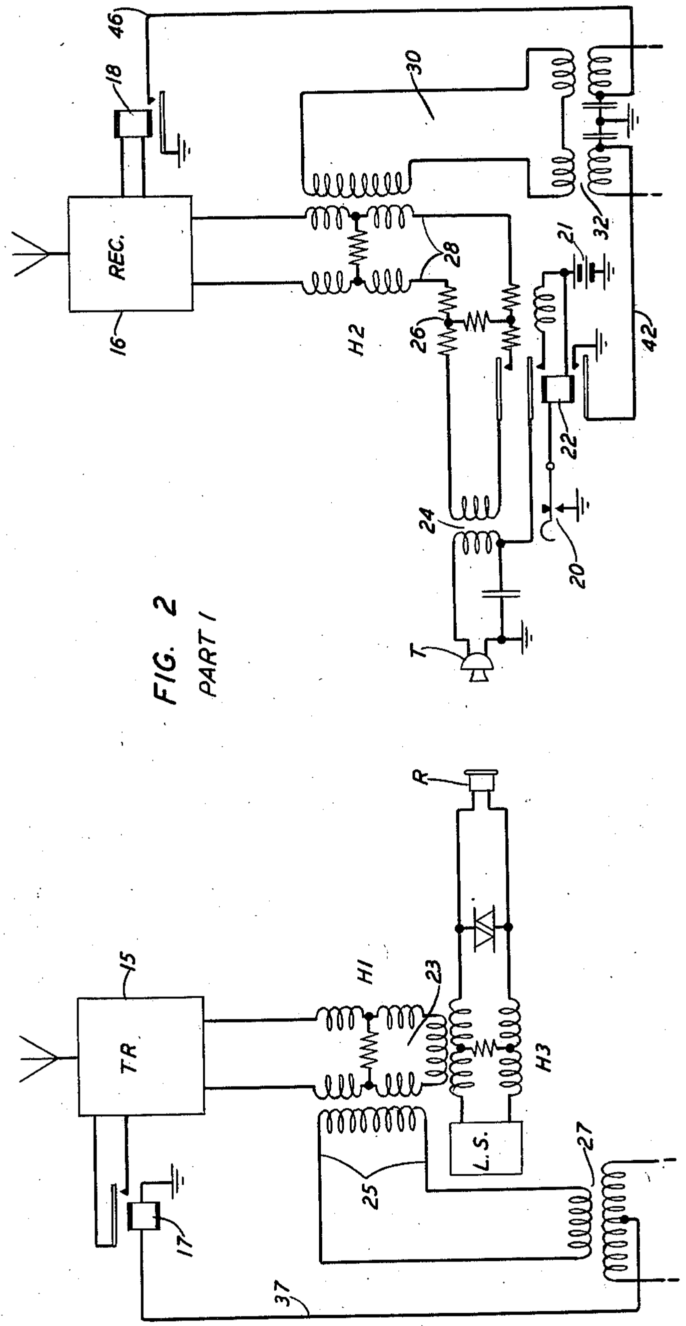
FIG. 2 PART I
INVENTOR
E. M. STAPLES
BY G. H. Stevenson
ATTORNEY March 11, 1952 E. M. STAPLES 2,589,158

MOBILE-RADIO AND WIRE SYSTEM

Filed April 2, 1948 4 Sheets-Sheet 2

FIG. 2 PART 2

INVENTOR
E. M. STAPLES
BY G H Stevenson
ATTORNEY

March 11, 1952 E. M. STAPLES 2,589,158

MOBILE-RADIO AND WIRE SYSTEM

Filed April 2, 1948 4 Sheets-Sheet 3

INVENTOR
E. M. STAPLES
BY G. H. Stevenson
ATTORNEY

MOBILE-RADIO AND WIRE SYSTEM

Filed April 2, 1948 4 Sheets-Sheet 4

INVENTOR
E. M. STAPLES
BY G. H. Stevenson
ATTORNEY

Patented Mar. 11, 1952 2,589,158

UNITED STATES PATENT OFFICE 2,589,158

MOBILE-RADIO AND WIRE SYSTEM

Elliot M. Staples, Hohokus, N. J., assignor to Bell Telephone Laboratories, Incorporated, New York, N. Y., a corporation of New York Application April 2, 1948, Serial No. 18,537

16 Claims. (Cl. 250—6)

Figure 2:
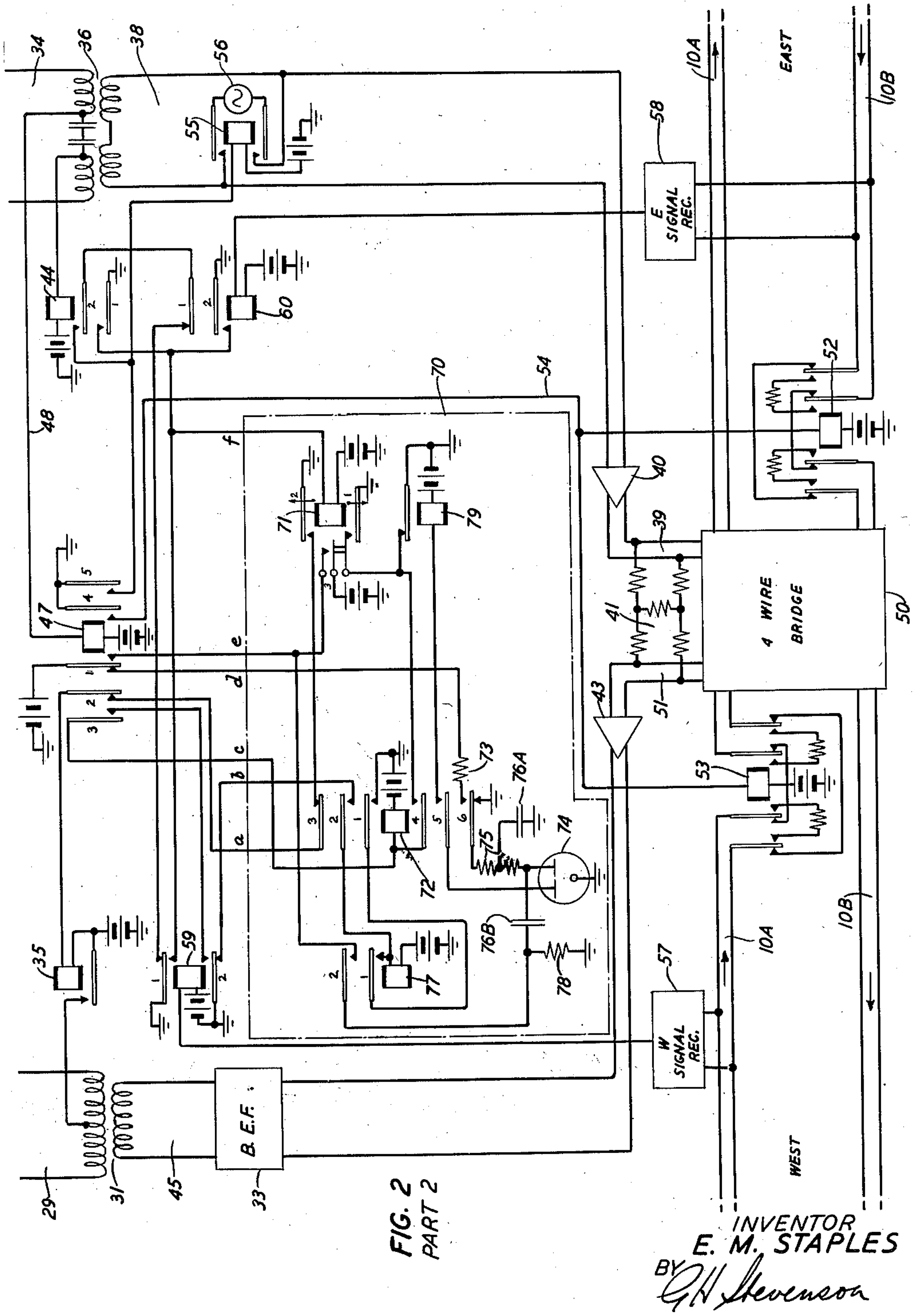

The present invention relates to a combined wire and radio system such as a mobile radio system in which a number of fixed two-way radio stations are situated at spaced points along a route of travel of a mobile unit equipped with a radio communicating set; and the invention has to do with provisions for avoiding interference effects due to the existence of multiple transmission paths between two or more fixed stations and the same mobile unit.

In accordance with one feature of this invention, provision is made in a mobile radio system for avoiding the effects in a receiver of reception over multiple transmission paths from the mobile unit via more than one of the fixed stations.

When the mobile unit is so located with respect to the fixed stations as to be in radio communicative relation to more than one of the fixed stations, the invention provides, as a further feature, for automatically disabling all but one of the transmitters at such stations so as to avoid transmission to the mobile unit simultaneously from more than the selected one of such stations.

The invention will be disclosed as embodied in a system for providing two-way radio telephone communication between planes flying a commercial route and any one of a number of ground stations located along the route or with any other plane flying the same route. The plane-to-plane communication is via a ground receiver, an interconnecting telephone line and the transmitter of another ground station.

In this system a talker at a ground station transmits his voice over the interconnecting telephone line to all of the other ground stations and thence by radio to all planes that may be in flight along the route, the radio transmission occurring from all of the ground stations except those at which the transmitters are locked out by the provisions of the present invention. Speech originating on a plane is picked up by a ground station and transmitted over the interconnecting line to all of the other ground stations, and is re-radiated from the ground station or stations at which the speech is not being received from the plane. Thus, other planes along the route are able to hear both sides of a radio communication between any plane and a ground station.

Speech originating on a plane may be received at more than one ground station with nearly equal strength. When this occurs the reception may be impaired by the effects of inequalities in the two or more paths over which the speech is being received. The invention, in one aspect, overcomes this evil by disabling the land line at one or more points such that only one path is permitted to exist for the received speech from the plane to any given receiving point.

As already mentioned, when a plane is in similar communicative relation to two or more ground stations, as may be determined by receipt at these stations of radio waves from the plane in equal or nearly equal strength, the speech transmission from ground to plane may be impaired if multiple paths are used. In such case the invention provides for automatically locking out the transmitters at all except one of the two or more such stations.

In the illustrative embodiment of the invention disclosed herein, if two or more ground stations receive a radio wave from the same plane, each of the stations sends out a control current to the neighboring ground station along the route. That station of the two or more which have received the radio wave is arbitrarily chosen for replying which does not receive the control current from a ground station to the west (for example). The only such station is obviously the most westerly of the stations which have received the radio wave. The other or others of these stations receive the control wave from the next station to the west and in this case the radio transmitter of such other station or stations is temporarily disabled in response to the control wave received from the west. A suitable period of time, such as a five-second interval, is allowed for a reply to be initiated from some one of the ground stations. If a ground talker operates his push-to-talk key within that time the temporary lock-out of the non-selected transmitters is maintained until his key is released. A new control cycle then ensues.

The receiver-segregation feature and the transmitter selection feature, while disclosed herein as embodied in the same system, can, if desired, be used independently of each other.

Figure 3:
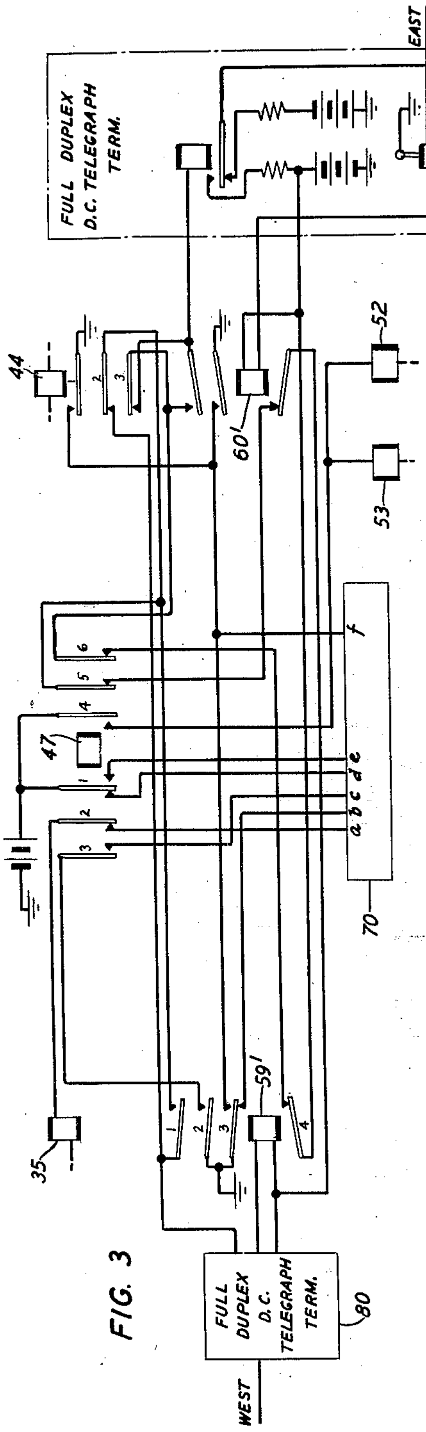
Figure 5:
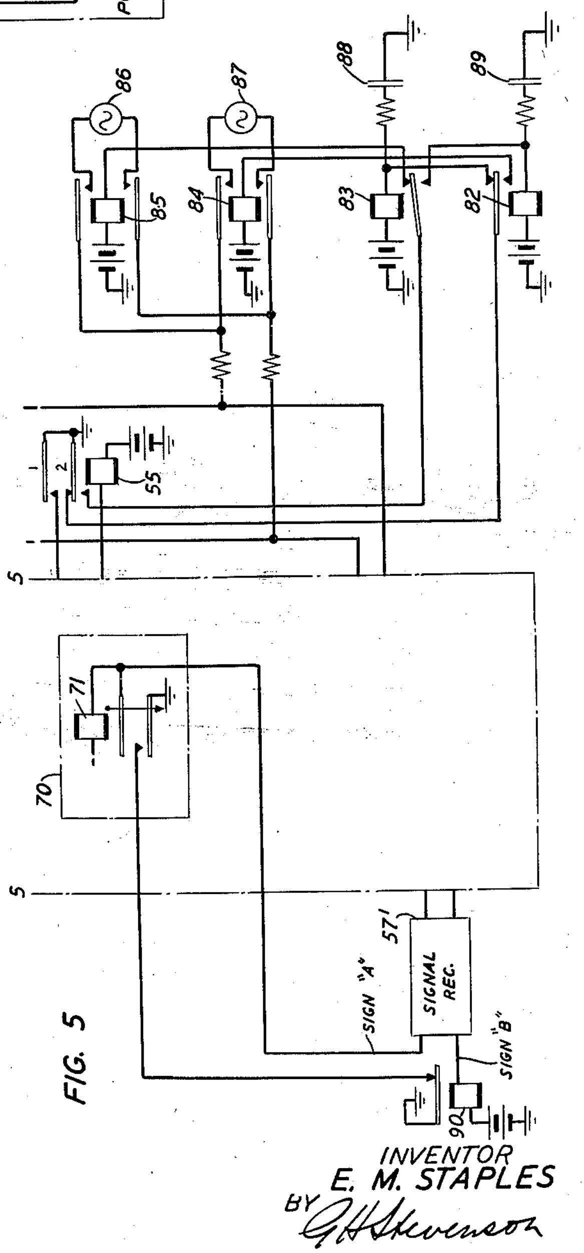
Figure 4:
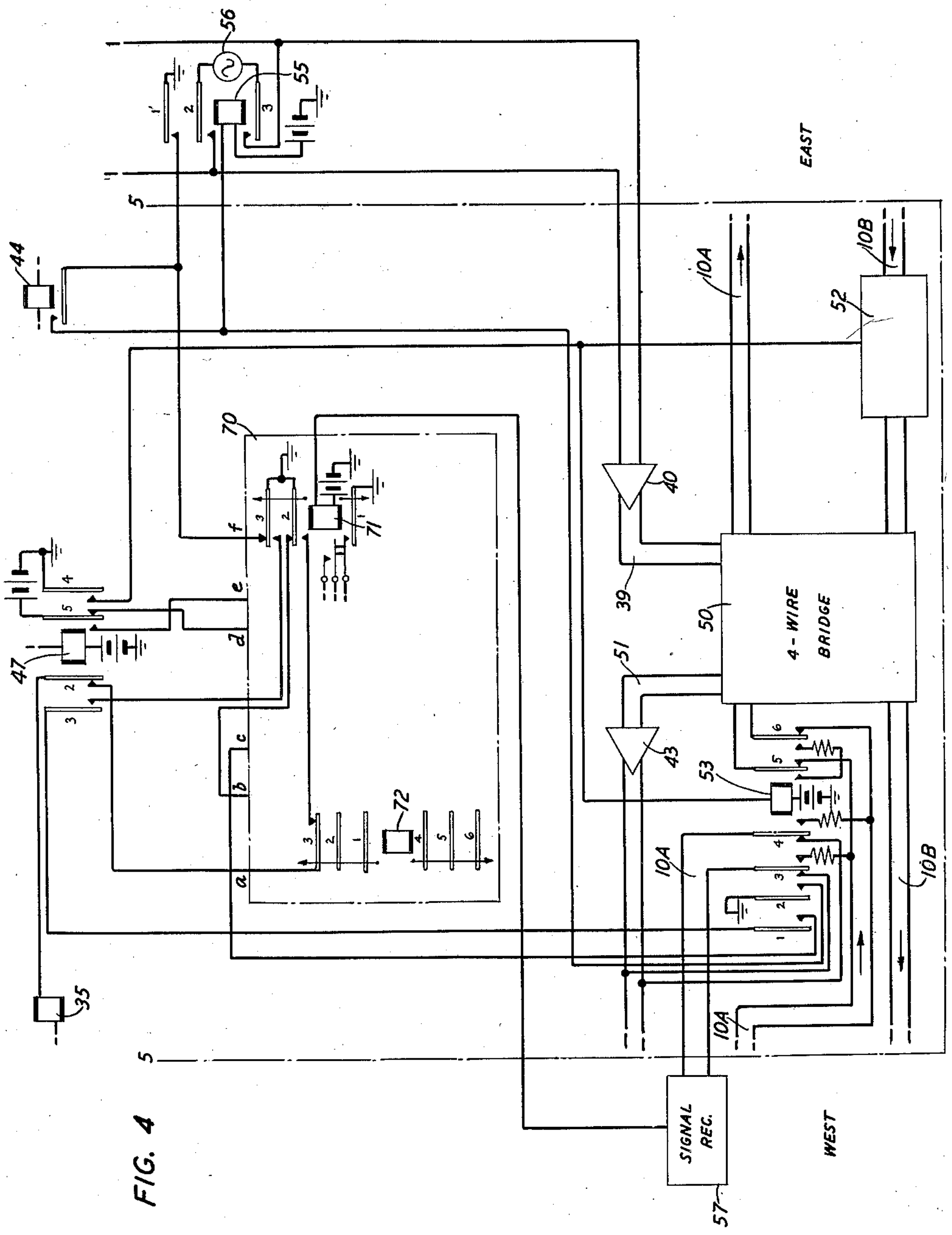

The nature of the invention and its various objects and features will appear more fully from the following detailed description in connection with the accompanying drawing in which:

Fig. 1 is a block schematic diagram of the system as a whole showing a number of ground stations along a flying route;

Fig. 2, consisting of Part I and Part II, is a schematic circuit diagram of the circuits and apparatus employed at each of the ground stations in accordance with this invention; and Figs. 3, 4 and 5 show modified control circuits according to the invention.

*Receiver segregation feature*

Referring first to Fig. 1, six ground stations A to F, inclusive, are shown spaced along a route of travel of airplanes. Three airplanes X, Y and Z are shown in flight on this route at the moment. A land line 10 interconnects each of the ground stations.

Let it be supposed at first that a talker at ground station B is talking to each of the planes X, Y and Z. In this case his speech travels over line 10 to station A at the left from which it is radiated to the plane X. Also his speech travels over line 10 toward the right from station B to each of the other ground stations from which it is radiated (unless a given transmitter is temporarily locked out). The speech is also radiated from ground station B. The speech is in this manner sent to each of the three planes assumed in flight over the route.

The arrows on the diagram of Fig. 1 indicate that speech is at the moment originating on the plane Y. The assumption is made that this speech is being received in ground stations B, C and D but not in any of the other ground stations. As described above, it is desired that this speech, when picked up by a ground station, be re-radiated through the distant transmitters such as those at A, E and F so that the other planes, in this case X and Z, will receive the speech sent out from plane Y. Considering station A for the moment, if the speech from plane Y were being received at station A over the line 10 from each of the three stations B, C and D, the quality of the speech might be impaired by the fact that the three paths are unequal in their transmission characteristics. The same would be true for speech received at stations E and F. The speech therefore as heard at stations A, E and F or on planes X and Z would, under these circumstances, be likely to be poor in quality. The present invention overcomes these evils by disabling the line 10 at appropriate points such as at 11 and 12 in Fig. 1. This has the effect that stations A and B receive speech from the plane Y only by way of the ground radio receiver at station B and that stations D, E and F receive speech from the plane Y only by way of the ground radio receiver at station D. Station C receives speech only through its own radio receiver. The location of the disabling points 11 and 12 in Fig. 1 is diagrammatic only and these disabling provisions will be described more fully in connection with Fig. 2.

Referring now to Fig. 2, the radio transmitter 15 and the radio receiver 16 are arranged to operate on the same radio frequency. This is true of the transmitters and receivers at all ground stations and those on the planes, which all operate on the same radio frequency. Each station is operated on a push-to-talk basis. All receivers are normally energized and in condition to receive. All transmitters are normally disabled and are provided with a start relay 17 which is normally deenergized and holds its back contact open.

The telephone set at the local ground station comprises a receiver R and a transmitter T. When the push-to-talk key 20 is operated, relay 22 pulls up its armatures and at its inner upper armature supplies talking current from battery 21 through the primary winding of the repeating coil 24 to the microphone. Relay 22 at its outer upper contact closes the talking loop 28. Relay 22 in closing its lower armature supplies ground over conductor 42 to a point in the secondary winding of repeating coil 32, left side of line 34 to a point in the primary winding of repeating coil 36, and thence through the winding of relay 44 to battery. Relay 44 in energizing closes at its first armature a path from ground for energizing relay 71. Relay 71 closes a circuit from ground, third armature of lock-out relay 72, second armature of relay 47 (provided that relay is not energized) and thence through the winding of relay 35 to battery. Relay 35 in energizing supplies battery by way of the mid-point of the secondary winding of repeating coil 31 and line 29, the mid-point of primary winding of repeating coil 27 and lead 37 to the winding of the start relay 17, causing that relay to start the transmitter 15.

The path for the speech waves from the transmitter T is as follows: repeating coil 24, pad 26, line 28, hybrid coil H2, line 30, repeating coil 32, line 34, repeating coil 36, line 38, amplifier 40, talk-back bridge 41, amplifier 43, band elimination filter 33, line 45, repeating coil 31, line 29, repeating coil 27, line 25, and hybrid coil H1. The speech here divides, part going to the transmitter 15 and part by way of hybrid coil H3, to the telephone receiver R on the one hand and the loudspeaker LS on the other hand.

The foregoing path for the talking current from transmitter T to the local receiver R and to the transmitter 15 includes the hybrid coil H2. The radio receiver 16 is connected to the opposite terminals of the hybrid coil H2 and from this point on the path through the ground station for the speech received by radio receiver 16 is the same as that traced for speech originating in the local telephone transmitter T, except, however, that this speech coming in over receiver 16 is not sent out over radio transmitter 15 as will now be explained. During the receipt of radio waves by receiver 16 the relay 18 is held operated by rectified carrier waves. When so energized it supplies ground over conductor 46 to the secondary of repeating coil 32, right-hand side of line 34, to repeating coil 36 and over lead 48 to the winding of relay 47 to battery, causing this relay to operate. Relay 47 at its second armature breaks the energizing circuit for relay 35. It is thus impossible during reception to energize the start relay 17 for transmitter 15 even though the push-to-talk key 20 may be pressed, since the energizing circuit for relay 35 cannot be closed as long as relay 47 is operated. (Relays 18 and 47, since they are carrier-operated, are referred to as codan relays.)

The transmission line 10 of Fig 1 is shown in Fig. 2 as a four-wire line comprising an eastward transmitting side 10A and a westward transmitting side 10B. A four-wire bridge 50 is included in this line for deriving from the respective sides of the line the unidirectional branches 39 and 51. This four-wire bridge may be of the type disclosed in the patent to F. A. Cowan et al. No. 2,035,536, granted March 31, 1936. The speech currents originating in the transmitter T or received from the radio receiver 16, not only pass through the talk-back bridge 41, but they also pass through branch 39 into the four-wire bridge 50 from which they are transmitted over the eastward line section 10A and over the westward line section 10B to other ground stations. Similarly, speech currents received from the west station over line 10A and received from the east station over line 10B pass through the bridge 50 and into the receiving branch 51 from which they pass to the receiver R and to radio transmitter 15. Speech currents received over the line 10 by the station of Fig. 2 pass through normally closed break points controlled by the cut-off relays 52 and 53. These relays are energized over lead 54 from the fourth armature and front contact of relay 47 whenever this relay is energized by incoming carrier waves in the receiver 16.

In order to enable the ground station of Fig. 2 to be controlled over the line 10 from another ground station for the purpose of retransmitting a signal, and also to enable this station to similarly control the other stations, a carrier signal channel is provided between the stations on the line 10. This includes a source of waves 56 at the station in Fig. 2 for transmitting control signals from this station and a pair of signal receiving circuits 57 and 58 for respectively receiving signals from the west over line section 10A and from the east over line section 10B. The carrier wave source 56 may have any convenient or suitable frequency either in the voice range or just above the voice range. It need occupy only a very narrow band of frequencies and these signal carrier waves are kept out of the telephone receiver, loudspeaker and radio transmitter at each station by the band elimination filter 33. The signal receivers 57 and 58 include narrow band selective filters for selectively receiving the carrier wave and a rectifier-amplifier for actuating the respective relay 59 or 60 whenever the carrier is being received.

The operation of the receiver segregation feature of Fig. 2 can best be understood by considering typical operations. Let it first be assumed that Fig. 2 is station A of Fig. 1. In this case there is no incoming carrier wave of sufficient strength to energize the codan relay 18. Therefore, relay 47 remains continuously unoperated and an energizing circuit for relay 35 exists through the second armature and back contact of relay 47 to the second armature and front contact of relay 71 which is now operated from the second armature of relay 60. Whenever a signaling wave is being received from the east over line 10B relay 60 is operated, relay 35 is operated and relay 17 is also operated to condition the transmitter 15 for retransmission of signals received over the line 10B. This speech may have originated in any one of the ground stations to the east or it may be the speech received by radio in station B. This speech passes through the normally closed contacts of the relay 52 to the bridge 50 and into branch 51 thence through band elimination filter 33 and so on up to the hybrid coil H1 where it divides, part going to the transmitter 15 and part to the local receiver R or loudspeaker LS. The signal currents also being received at this time are kept out of the transmitting channel by the filter 33. When station A talks, the key 20 is pressed, causing operation of relay 44 which energizes the transmitter by way of relay 35 as previously described, and also energizes relay 55 causing carrier signal waves from source 56 to be impressed on circuit branch 38 from which they pass through amplifier 40 to branch 39, bridge 50 and to the east over line branch 10A and to the west over line branch 10B. The speech currents from the transmitter T pass to the radio transmitter 15, as previously described, and also out over the line 10 in both directions from this station. Assume that when station A talks the plane has removed its carrier. Therefore, cut-off relays 52 and 53 will be released at all stations and speech from station A will be retransmitted from all the other stations except at those where the radio transmitters are locked out.

It will now be assumed that the circuit of Fig. 2 is the circuit of station B of Fig. 1. During such times as this station is receiving radio from the plane Y relays 18 and 47 are energized. During pauses in the radio transmission from plane Y when the radio wave is cut off, relays 18 and 47 release. When relays 18 and 47 are energized the energizing circuit of start control relay 35 is broken but the energizing circuit of relay 55 is closed, transmitting some of the signal wave from the source 56 over the line 10 in both directions from this station. Also both of the cut-off relays 52 and 53 are energized, opening line 10A and line 10B adjacent the four-wire bridge 50.

The carrier control wave transmitted to the left to station A closes the start relay for the transmitter at that station, causing the speech being received at station B to be retransmitted through station A. This is done by energizing relay 60 of station A, which causes relays 71, 35 and 17 to pull up.

The carrier control currents transmitted toward the east from station B energize relay 59 in station C. This does not start the radio transmitter at station C since this station is receiving radio transmission from the plane Y. Stations D, E and F do not receive carrier control currents from station B since cut-off relay 53 is operated at station C.

Relay 52 in energizing prevents the receipt of speech waves from station C or other stations toward the right from entering the circuit of Fig. 2 (station B). Thus the only radio speech received at either station A or B from the plane Y is that which is received in the radio receiver of station B.

The manner in which speech originating in station B is transmitted to the other ground stations and retransmitted from them by radio is the same as was described in connection with station A.

When the circuit of Fig. 2 is station C of Fig. 1, radio messages from the plane Y are received in the local receiver of Fig. 2 but are not received at any of the other ground stations over line 10 from station C for the reason that stations B and D on either side of station C are also receiving radio messages and are holding the line 10 entering those two stations interrupted at the points 11 and 12 of Fig. 1.

When the circuit of Fig. 2 is station D of Fig. 1, the operation is the same as that described in connection with station B except that in this case it is the cut-off relay 53 which prevents station D and also stations E and F from receiving radio speech from the plane Y by way of any ground station other than station D.

The operation at stations E and F is the same as that described as taking place at station A except that the carrier control signal and voice currents are received from station D when plane Y is talking.

*Transmitter-selection feature*

In accordance with this feature of the invention, if a plurality of ground stations such as stations B, C and D of Fig. 1 are in receiving radio relation to a plane such as Y, provision is made for insuring that the ground reply to the plane is by way of the radio transmitter of only one of the three stations, in this case the radio transmitter of station B. The selection of transmitter to be used for the ground reply is made on the entirely arbitrary basis that the selected station is the most westerly of the group of stations that are in receiving relation to the plane. As pointed out above, when the radio wave is received from the plane, control current is sent out from the one or more receiving ground stations in both directions over the line 10. Under the assumptions made in Fig. 1, this control current will be received by ground stations C and D from the westerly direction but will be received at ground station B only from the easterly direction. The radio transmitter at ground station B is selected for ground reply by the two coexisting conditions that it is receiving a radio wave from the plane and that it is not receiving a control current from the west. In other words, the radio transmitter at each of stations C and D is locked out by a control current received from the west over the line 10 at the same time that the receiver at stations C and D is receiving radio waves from the plane.

The lock-out referred to of the transmitters at stations C and D is for a short period only, such as for five seconds after the radio wave from the plane is shut off. This five-second interval is the time allowed within which a ground station may make a reply and the transmitters at stations C and D be locked out. If no ground reply is received within this five-second interval, the lock-out conditions are terminated and the circuits are returned to normal. Also a new lock-out pattern is inaugurated if the plane starts re-transmitting by radio within this five-second interval and if no ground station has in the meantime responded.

The lock-out feature in accordance with the invention, for disabling the transmitter under control of a control wave received from the next station to the west, is illustrated as embodied in the parts enclosed within the broken-line rectangle 70 of Fig. 2. This includes as one element a timing circuit in the form of a resistance-capacity combination and a gaseous discharge tube which is arranged to discharge if no push-to-talk key is operated at any ground station or on the communicating plane within a five-second interval, in which latter case the lock-out is removed. The lock-out when established holds open the energizing circuit of the transmitter start control. The tube referred to may be Western Electric Company type 313 CC (cold cathode) tube, by way of example.

The lock-out relay 72 can be energized if, and only if, a control current is received from the west when relay 47 is energized. A circuit then exists from battery, winding of relay 72, third armature of relay 47 and second armature and front contact of relay 59. This is the condition which denotes that there is a station to the west which is also responding to the receipt of the radio wave from the plane and has its relay 47 operated by the radio wave, as a result of which control current is being sent out from that station. This is the condition represented in Fig. 1 as existing at stations C and D. Relay 72 at its third armature holds open the energizing circuit of start control relay 35. Relay 72 locks up over its own fourth armature and back contact of relay 79. When the radio wave from the plane is cut off, relays 47 of all three stations B, C and D restore. The first armature of relay 47 at its back contact supplies voltage from battery through resistance 73 to the timing circuit of gaseous tube 74, comprising resistors 75 and capacity 76, at the stations (C and D) at which relay 72 is in an operated condition and holding the front contact of its sixth armature closed. At these same two stations, relay 59 releases and closes an energizing circuit for relay 77 through the second armature of relay 72 and second armature and rest contact of relay 59. Relay 77 locks up over its first armature and the first armature of relay 72. Relay 77 in closing its second armature contact prepares a release path for the timing circuit to the resistance 78 and condenser 76B of tube 74.

Assuming that no push-to-talk key in the system is operated within the five-second interval, the timing circuit elements 75, 76 allow the voltage to build up on the start electrode of tube 74 to a sufficient value to cause breakdown of this tube. This discharge current passes through the winding of relay 79 which operates and opens the locking circuit of relay 72. Relays 72, 77 and 79 restore, as does also tube 74.

Assume now that a talker at some ground station operates his push-to-talk key within the five-second timing period. If the talker is at a station other than a locked-out station, operation at the locked-out station of either relay 59 or 60 by the control wave energizes relay 71. Closure of the third spirng contact on relay 71 supplies battery voltage over the previously prepared release circuit through second armature of relay 77 to resistor 78, condenser 76B, discharging tube 74 and energizing relay 79. This does not release lock-out relay 72 which remains locked to first armature of relay 71. Relay 35 therefore remains deenergized and the radio transmitter is not started. If the talker is at the locked-out station, operation of relay 44 energizes relay 71 and the same action takes place.

If the talker on the plane again operates his talk key after less than a five-second interruption and if in the meantime no ground station has responded, relay 47 at a locked-out station energizes and at its first armature supplies battery voltage to the release circuit over second armature of relay 77 to resistor 78 and condenser 76B. This discharges tube 74, energizes relay 79 and in this case releases lock-out relay 72 since relay 71 is not operated. A new control cycle may now begin.

A talker at any ground station can release the lock-out if desired by operating his push-to-talk key and momentarily releasing it. This discharges the tube 74 and operates relay 79 as above described by supplying voltage to resistor 78 and condenser 76B from the third spring of relay 71, and when the key is momentarily released relay 71 opens its first armature contact and unlocks relay 72 which releases, causing relays 77 and 79 to release.

Fig. 3 illustrates how a full duplex direct current telegraph line may be used in place of the carrier signal channel of Fig. 2 for transmitting control current between the ground stations. Only the control circuit is shown, the talking circuit being omitted for simplification of the drawing. The talking circuit is the same as in Fig. 2 except that in this case the filter 33 is omitted. Full duplex telegraph terminals are indicated at 80 and 81. These actuate the east and west control current relays 60′ tnd 59′ which correspond in function to relays 60 and 59 of Fig. 2. In this case, however, relays 59′ and 60′ are normally energized since the line circuit is normally closed. The east line circuit can be opened at any one of three points (assuming relay 60′ remains energized); at armature 3 of relay 44 when that relay is energized; at armature 6 of relay 47 when that relay is energized and at armature 4 of relay 59′ if that relay releases. Similarly, the west line circuit can be opened at armature 2 of relay 44 when that relay is energized, at armature 5 of relay 47 when that relay is energized and at armature 3 of relay 60′ if that relay releases. From this it is seen that a control signal is sent out from a station in both directions to the next station on either side when a talk key is actuated at the given station and relay 44 is energized; or when relay 47 responds to a received radio wave; and a control signal is repeated through a station when either relay 59′ or 60′ is released by the opening of the line at a neighboring station.

If relay 60′ is released by a control signal from the east, it repeats this signal to the line to the west by opening that line at armature 3; it supplies ground to terminal *f* leading to relay 71 which energizes transmitter start control relay 35 if both relays 47 and 72 are normal. The station is then in condition to retransmit speech received over the line from another station.

If relay 59′ is released by a control signal from the west the same kind of functions are performed unless relay 47 is operated, the signal being now repeated into the east line. If relay 47 is energized, ground from armature 2 of relay 59′ is supplied over armature 3 of relay 47 to the winding of lock-out relay 72 which as previously described locks up to normal contact of relay 79. When relay 47 releases, battery voltage is supplied to the timing circuit as previously described. Release of relays 47 at the other stations reenergizes relays 59′ and 60′. If within the allowed time interval either relay 59′ or 60′ releases, relay 71 is energized from either armature 3 of relay 59′ or armature 2 of relay 60′.

It will be noted that armature 2 of relay 44 is shunted by armature 1 of relay 59′; also, that armature 3 of relay 44 is shunted by armature 1 of relay 60′. These shunting contacts on relays 59′ and 60′ prevent false operation of the lock-out circuit at a selected station by premature operation of the talk key at another station before the relay 47 at the selected station has released. Operated condition of relay 47 at another station from that at which the talk key is prematurely operated finds relays 59′ and 60′ at the latter station released. Their respective armatures 1 are closed against their rest contacts so that operation of relay 44 does not result in opening either the east or west telegraph line circuit. Otherwise a circuit through the winding of lock-out relay 72 at a station where relay 47 is still operated could be closed if relay 59′ thereat were allowed to release.

The operation of the circuit of Fig. 3 is entirely analogous to that of the circuit of Fig. 2 and no further description is deemed necessary.

The principle and mode of operation of the invention has been described in one form (Fig. 2) using an alternating current or carrier control channel and in another form (Fig. 3) using a direct current control channel. Depending upon the available lines and equipment in particular cases one or another type of control channel may be preferred. Many variants of the control channel are possible and brief reference will be made to two other types which applicant has devised as further illustrating practical applications of the main inventive concepts. These are shown in Figs. 4 and 5.

The circuit of Fig. 4 is similar to that of Fig. 2 and only so much of the circuit has been included in Fig. 4 as is deemed necessary or helpful in gaining an understanding of this modification. The relays indicated by like number are the same as those of Fig. 2 and perform the same functions although the number of armatures on any one relay and the number of contacts controlled by a relay may differ.

The distinction of the Fig. 4 modification is that it employs only a single receiver at each station instead of separate east and west receivers as in Fig. 2. The two relays 59 and 60 of Fig. 2 are omitted and the relay 71 has its winding directly energized from the signal receiver 57. The relay 53 is provided with extra armatures and extra circuit control functions, as will appear from the description of the operation. With relay 53 not operated the signal receiver 57 is connected to receive signals from the east and west lines or from the local signal supply circuit. With relay 53 operated the signal receiver 57 receives a signal only from the west line.

When the radio wave is received the relays 47, 52 and 53 operate as before. Relay 52 opens the east line and relay 53 opens the west line and switches the signal receiver 57 to the west line. Armature 2 of relay 53 supplies ground to operate signal transmitting relay 55 which sends the signal wave from source 56 out over the line in both directions from this station. This action occurs at each station where the radio wave is received and operates relay 47. At all stations where relay 47 operates except the most westerly station, the signal receivers 57 operate and energize relay 71. This causes the lock-out relay 72 to energize over a circuit which includes armature 1 of relay 53, armature 3 of relay 47 and the third armature and front contact of relay 71. At stations where this action occurs the lock-out circuit operates in the same manner as previously described and holds the transmitters of these stations locked out for a five-second period after the plane's carrier is removed unless a reply is made or transmission is resumed within this five-second period.

If several stations respond to the received radio wave and operate their relays 47 the most westerly of the group of stations is not locked out since relay 71 now has no energizing circuit, the signal receiver 57 being unable to receive the signaling current from the east since relay 53 is energized and holding open the back contacts of its armatures 3 and 4. Since this is the only station of the group responding to the radio wave at which the lock-out circuit is not actuated, this becomes the selected station for reply. At all stations on the line at which the relay 47 did not operate the signal receiver 57 responds to the signaling current and energizes relay 71 which starts the transmitter control relay 35. The lock-out relay 72 at these stations is not energized since it is held open at a front contact of relay 47 and also of relay 53. When the plane opens its talk key and cuts off the radio wave, relays 47 return to normal and the transmitters may be operated for ground reply at all stations except those locked out. The stations at which the transmitters may be operated include the most westerly of the group of stations assumed to have responded to the radio wave. When any station operates its talk key, energizing relay 44, relay 55 is energized over a circuit including armature and front contact of relay 44 and the third armature and back contact of relay 71. The control wave is sent out to all the other stations and, except at locked-out stations, a circuit for the transmitting start control relay 35 is closed through the second armature of relay 47, third armature of relay 72 and second armature and front contact of relay 71. At the station where the relay 44 is operated relay 71 in responding to the control tone opens the original energizing circuit for relay 55 at the third armature of relay 71, but a locking ground is provided from the first armature of relay 55 as long as relay 44 is actuated.

The circuit of Fig. 5 differs from that of Fig. 4 only in the control circuit which, in the case of Fig. 5, employs two frequencies and operates as a spurt system. One of the frequencies is applied for a short interval when a push-to-talk switch is operated. This starts the radio transmitters and operates the transmitter lock-out circuit. The other frequency is applied for a short interval when the push-to-talk switch is released. This turns off the radio transmitters. This system does not require the band elimination filters 33 shown in Fig. 2 since the signals are not applied during voice transmission. It is thought that the construction of this circuit will be clear from a description of its operation.

When either relay 44 or relays 47 and 53 operate, a circuit is closed for energizing signal relay 55. Relay 83 is normally energized over back contact and second armature of relay 55, relay 82 being normally deenergized. When this circuit is broken relay 83 remains energized momentarily and a circuit is closed through the second armature and front contact of relay 55, front contact of relay 83 to the winding of relay 85 which energizes and sends out signaling current from source 86 over the line in both directions. After condenser 88 has had time to charge up, relay 83 releases and causes relay 85 to release, thus cutting off the signaling energy from source 86. Relay 82 now energizes over the back contact of relay 83 but performs no function at this time.

The signal receiver 57′ is assumed to include selective tuning or filtering means for separating signal A received from source 86 and signal B received from source 87. When current of frequency corresponding to signal A is received, relay 71 is operated and closes a locking circuit for itself over the back contact of relay 90. The operation of relay 71 starts the transmitters and otherwise performs the same functions as in the case of Fig. 4.

The release of relay 44 or 47 opens the energizing circuit for relay 55 which releases and closes an energizing circuit for relay 84, causing this relay to send out signaling current from source 87 in both directions over the line. When current of this frequency is received at a station, the signal receiver 57′ responds and actuates release relay 90 which releases relay 71 and returns the circuit to normal. The signal 87 is sent out for a time determined by the timing circuit including the condenser 89. When this condenser charges to the point where relay 82 releases, the energizing circuit for relay 84 is broken. Relay 83 energizes to restore the signal transmitting circuit to normal.

In Figs. 4 and 5 using a single signal receiver, relay 71 is made slow to release and relay 72 is made slow to operate by a somewhat greater amount than the release time of relay 71; and the release time of relay 71 is greater than the transfer time of relay 53. These time relations are for the purpose of avoiding improper relay operations in case the codan relays 47 of different stations either do not energize simultaneously or release simultaneously.

The single receiver circuit should be adjusted (as by the aid of the resistances shown in its input) to make the signal input impedance about the same when it is connected to the line 10A or to the branch 51. Also it should be designed or adjusted to release or to fail to respond when the input is of the order of 20 decibels below normal level, to provide sufficient transmit-receive signal margin when a considerable number of ground stations are connected to the same line, with their bridges in multiple.

The invention is not to be construed as limited to the detailed disclosure nor to the specific applications described or shown, since these are for illustration and by way of example, and the scope of the invention is defined in the claims.

What is claimed is:

1. In a mobile radio communication system, a plurality of fixed two-way radio stations situated at intervals along a route of travel of a mobile unit, a line interconnecting said stations, a control-initiating means at each station capable of operating in response to the reception of a sufficiently strong radio signal from said mobile unit, said means being operative in response to said reception to initiate and transmit a control in both directions via said line to the other said stations, and lock-out means at each station responsive to the reception of said control from only one of said directions for disabling the radio transmitter at the respective station, for permitting selection of a transmitter for reply from a fixed station.

2. In a mobile radio system, a plurality of ground stations at spaced points along a route of travel of a mobile unit having a radio set, radio transmitting and receiving means at each ground station, a four-wire line interconnecting said ground stations having two oppositely directed outgoing channels and two oppositely directed incoming channels, means connecting the output of the radio receiving means at each station to both of the channels transmitting away from the station, signal receiving means at each station, means connecting the input of the radio transmitter and said signal receiving means at each station to the two channels incoming to the station, and means responsive to the receipt of radio waves at any station for disabling the two channels incoming to such station.

3. In a mobile radio system, a plurality of ground stations at spaced points along a route of travel of a mobile unit having a radio set, radio transmitting and receiving means at each ground station, a line interconnecting said ground stations, ground stations A, B and C being next to one another and in that order, means operative in response to the reception of radio signals from said mobile unit by stations B and C, said signals not being received by station A, to cause station A to retransmit by radio the signal received over the interconnecting line from station B, means intermediate each pair of stations for disabling the transmission line portion therebetween and means operative under these conditions of reception for actuating said disabling means in the line portion between stations B and C to prevent station A from receiving signals over said line portion from station C.

4. A radio and wire transmission network including a plurality of two-way radio stations with a wire line interconnecting them, means at each station to connect a first portion of the output of the radio receiving means thereat to a point in bridge of said line, means at each station to connect the input of the radio transmitting means thereat to said point in bridge of said line, and means at each station operative in response to a second portion of the output of said receiving means for preventing transmission along said line from one side to the other of such station past said bridging point, said means comprising relay means for opening said wire line between said bridging point and the bridging point of an adjacent station.

5. In a radio and wire transmission network including a plurality of two-way radio stations with a four-wire line interconnecting them, means at each station to repeat signals between said line and the radio signaling equipment thereat, in both directions, and means at each station operating in response to the receipt of radio signals thereat for sectionalizing said transmission line at a point adjacent such station to prevent through transmission along the line past such station said means comprising relay means for opening the incoming portions of said four-wire line between the points where said portions connect to such station and to an adjacent station.

6. In a radio and wire transmission network, a plurality of two-way radio stations, a four-wire line interconnecting said stations, means to transmit signals along said line between said stations, means to repeat signals between said line and the radio signaling equipment at each station, in both directions, apparatus adjacent each station in each of the portions of the four-wire line directed towards said station for interrupting transmission of signals to said station through such line portions and circuits responsive to received radio waves for actuating said apparatus.

7. A radio wire network comprising a plurality of two-way radio stations interconnected by a wire line, means at each station operated by the receipt of radio waves for sending control signals over the line to the other stations, means at a station to transmit message currents by radio and also over said line to other stations into the inputs of the radio transmitters thereat, means at each station actuated upon receipt of radio waves thereat for sending control signals towards both adjacent stations along said line, a control circuit for the transmitter at each station including disabling means effective when control signals are received at said station from an adjacent station lying to a chosen side of said station, and enabling means effective when control signals are received only from the adjacent station lying to the other side of said station.

8. In a radio wire communication network, a succession of two-way radio stations situated along and connected to a transmission line, a codan relay at each station operated by the receipt of radio waves for sending control signals over the line to the other stations, and a radio transmitter starting circuit at each station, said circuit having three control points individual to said circuit and located at said station, namely, one control point operated by the codan at the same station, another control point operated by the control waves received from another station, and a third control point operated by the control waves received from only a station located to the other side of said station from said other station.

9. The combination recited in claim 8 in which the means actuating said third control point includes timing means for holding said control point actuated for a definite period of time after the cessation of receipt of the last-mentioned control waves.

10. In a radio wire communication network, a succession of two-way radio stations situated along and connected to a transmission line, a codan relay at each station operated by the receipt of radio waves for sending control signals over the line to the other stations and a radio transmitter starting circuit at each station, means at a station differently responsive to control signals received from opposite directions over the line, said means responding to control signals received from the first direction over the line to operate the transmitter starting circuit subject to non-operation of the codan relay, said means responding to control signals received from the second direction over the line coincidentally with operation of the codan relay for preventing operation of the transmitter control circuit for a measured time interval after release of said codan relay and the cessation of said control signals from said second direction.

11. The combination according to claim 10 in which said differently responsive means includes a lock-out circuit for opening the transmitter starting circuit, and means for operating said lock-out circuit in response to control signals received only from said second direction.

12. The combination according to claim 10 in which one control signal receiver is connected to the portion of the line receiving from the first direction and another control signal receiver is connected to the portion of the line receiving from the second direction, and said transmitter starting circuit is operated by both signal receivers, a lock-out circuit for said starting circuit and means controlling said lock-out circuit from said second signal receiver but not from said first signal receiver.

13. The combination according to claim 10 in which the means for sending control signals over the line comprises a carrier wave signal channel employing a carrier frequency separable from the frequencies used by the communication waves.

14. The combination according to claim 10 in which the means for sending and receiving control currents comprises a full-duplex telegraph line including at each station a separate receiving relay for opposite directions of reception and means for closing each line loop through contacts of the opposite receiving relay and the codan relay.

15. The combination according to claim 10 in which the means for sending control signals over the line comprises sources of carrier currents of two frequencies and means for sending a spurt of one frequency to denote the beginning of a control signal and a spurt of the other frequency to denote the end of a control signal.

16. In a mobile-radio communicating system, a plurality of fixed radio stations situated at intervals along a route of travel of a mobile unit, a four-wire line interconnecting said stations, said line having two oppositely directed outgoing channels and two oppositely directed incoming channels for each station, a receiver at each station to receive signal modulated carrier waves by radio from said mobile unit, means for connecting the signal output of said receiver to said outgoing channels for transmission to the other stations, and means responsive to the output of said receiver to prevent reception at one station over said incoming channels of signals simultaneously received over a plurality of radio paths from said mobile unit by a plurality of others of said stations, said last-mentioned means comprising relay means to open the said incoming channels at said one station.

ELLIOT M. STAPLES.

REFERENCES CITED

The following references are of record in the file of this patent:

UNITED STATES PATENTS

| Number | Name | Date |
|---|---|---|
| 1,522,919 | Gauthier | Sept. 8, 1925 |
| 1,894,019 | Buckley | Jan. 10, 1933 |
| 2,070,866 | Saunders | Feb. 16, 1937 |
| 2,213,105 | Laube | Aug. 27, 1940 |
| 2,393,291 | Clark | Jan. 22, 1946 |
| 2,469,555 | Hitchcock | May 10, 1949 |
| 2,490,061 | Jensen et al. | Dec. 9, 1949 |